Nov. 29, 1966  R. H. OITTO, JR  3,287,920
DEVICE FOR SECURING A PLUG IN AN INFUSION HOLE
Filed Dec. 20, 1961
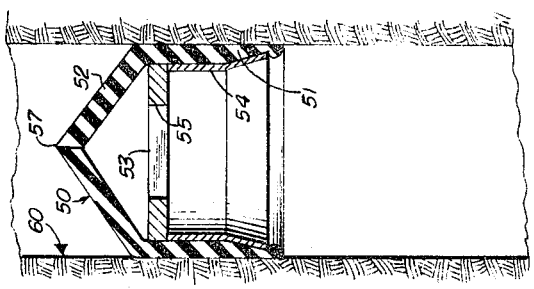
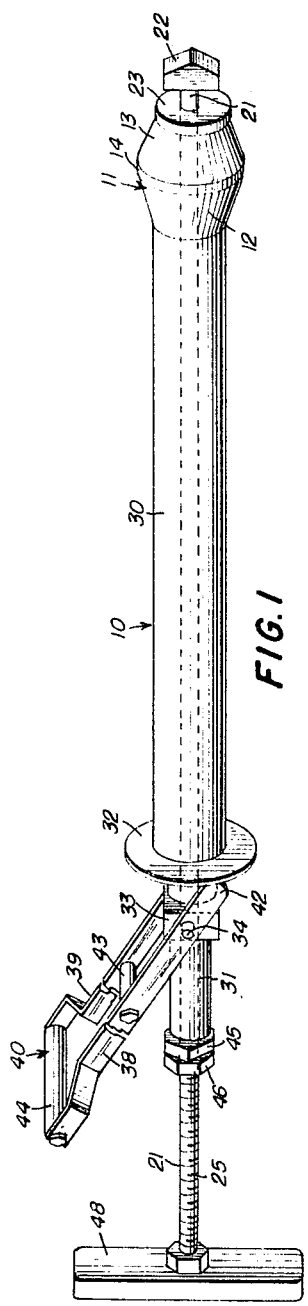
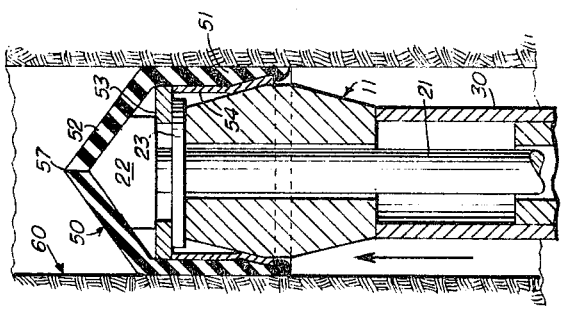
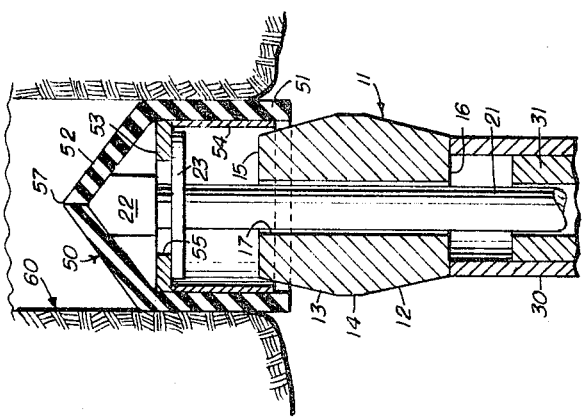
INVENTOR
RICHARD H. OITTO, JR.
BY Ernest S. Cohen
Gersten Sadowsky
ATTORNEYS

United States Patent Office 3,287,920
Patented Nov. 29, 1966

3,287,920
DEVICE FOR SECURING A PLUG IN AN
INFUSION HOLE
Richard H. Oitto, Jr., Pittsburgh, Pa., assignor to the
United States of America as represented by the Secretary of the Interior
Filed Dec. 20, 1961, Ser. No. 160,962
5 Claims. (Cl. 61—63)

The invention herein described and claimed may be manufactured and used by or for the Government of the United States of America for governmental purposes without the payment of royalties thereon or therefor.

The invention concerns an apparatus for plugging an infusion hole made in rock structures such as strata of a mine wall or roof, in connection with bonding the strata using liquid adhesives or resins. Bonding in this manner requires that the adhesive solutions be injected under pressure into the infusion hole. From there the solutions flow into the fractures and cracks spreading out around the hole. When the adhesives are solidified within the fractures and cracks of the strata they form a tough bond whereby they strengthen and unify the mass of the strata. Such procedures are most useful in rock structures supporting openings in mine developments and excavations, which have become overly stressed and failed due to the removal of adjacent supporting strata. Accordingly, in rock-bonding with adhesive liquids there is sought a safe, efficient, and economical means of improving the support potential in fractured metamorphic rock structures.

Any application of rock bonding by infusion of adhesive liquids generally requires that a plurality of holes be drilled in a predetermined pattern to obtain maximum fluid penetration and to allow the selected area to be thoroughly covered with the bonding material. To achieve these ends it is necessary that the injection pressures be sufficiently high to produce fluid penetration into remote voids of the strata, and that steps be taken to contain the liquid in the fractured rocks until gelation of the liquid occurs. In one such bonding application, sixteen injection holes 1½ inches in diameter, and approximately 7 feet in depth, were drilled horizontally into the walls of a mine drift. The holes were arranged in two parallel rows and about 6 to 7 feet apart, having a horizontal spacing between holes of about 8 feet, and wherein the holes in the lower row were placed midway between those above. With this injection hole pattern, a radial flow of only 4 feet about each injection hole would result in the material injected through one hole contacting the material injected through an adjacent hole. Pressures as high as 100 p.s.i. applied to the injectors were found to be satisfactory for delivering the fluid to at least the coarser cracks in the strata with somewhat higher pressures to reach the finer fractures being indicated. For containing the fluid under pressure within the strata, the fractures and cracks in the exposed walls of the drift were covered with gunite, a cement applied by a cement gun. To avoid the loss of fluid back through the infusion holes, they were plugged in accordance with the invention hereinafter more fully explained.

The plugging assembly of the present invention may be applied within the infusion hole before or after the fluid is injected, depending for the most part upon the nature of the fluid used. A bonding material such as one including a polyester resin and catalyst is best applied to the infusion hole after the plugging assembly is placed therein. A suitable bonding material of this type was found in considering the American Cyanamid Company's polyester resin PDL/7–892, which is a solution of polyester resin solids in monomeric vinyl toluene with a ratio of about 2 parts of solids to 1 part of solvent by weight. It is a high molecular weight polyester that is physiologically inert and, for the most part, chemically inert except when activated by a catalyst. For this particular application a formulation of 15 parts of polyester resin to 1 part peroxide catalyst solution by volume was used. Since this mix of resin and catalyst was found to gel in 3 to 4 minutes at 70 degrees Fahrenheit, and became solid in less than one-half hour, it was found most expedient to keep these substances separate until they were actually injected at the infusion hole. A pumping unit having two piston pumps connected to and driven by an air cylinder was used to deliver the proportioned polyester resin and the catalyst solutions separately to the injector. To prevent fouling of the injector by catalyzed resin, a concentric dual tube injector in which the solutions remained separated until they were discharged from the injector tip was used. The injector was secured in a hole by extending a center-hole hydraulic ram at the injector base, thus forcing a rubber sealing ring against the circumference of a hole. To mix the two solutions together and to contain the mix in an injection hole until it gelled, a plugging means according to the present invention served as a combination mixer and back-pressure valve. As will become hereinafter more apparent, upon discharge from the injector, the two solutions enter a hollow in a plug assembly where they are mixed by a swirling action caused by the difference in their discharge velocities, and pass through a slit in the tip of the uniquely secured plug assembly to enter the full depth of the injection hole. The slit permits fluid flow in one direction only. A reversal in flow causes the slit to close, thus sealing the hole.

The plugging assembly may also be applied in the infusion hole in accordance with the present invention, after pumping the hole with bonding material which does not gel too quickly. A material of this type is a sodium bichromate-lignosulphonate solution. When lignin liquor, a by-product of the sulphite process of wood plug production, is combined with a solution of sodium bichromate, an insoluble gel is formed. By varying the chrome-lignin ratio, the firmness of the gel and the gelling time can be regulated. A suitable batch formulation was found to be 3.1 quarts of 50 percent sodium bichromate solution to 4 gallons of 50 percent calcium base, spent-sulphite liquor. Gelling time of this material at 75 degrees Fahrenheit was 20 to 30 minutes. The pH of the water used to prepare the sodium bichromate solution ranged from 8.1 to 8.3. The chrome-lignin solution was mixed at the site as needed, and pumped into the hole at pressures ranging to 800 p.s.i. After pumping a suitable quantity of the solution into the hole, the injector was removed and the reverse flow therefrom was stopped by applying the plugging assembly which held the chrome-lignin solution in place until it gelled.

It is therefore an object of the present invention to provide an apparatus for facilitating the supplying of fluid under pressure into holes made in strata, and to thereafter retain the fluid within the strata.

A further object of the present invention is to provide apparatus to secure a plugging means within a hole in strata, by deforming the plugging means within the hole.

A still further object of the present invention is to provide a plugging means for a hole, which means is also operative as a check valve.

These and other objects and advantages of the invention will be more clearly understood from the following description of a preferred embodiment of the invention, considered together with the accompanying drawing wherein FIG. 1 is a side elevation of an expander mechanism shown completely assembled and operated;

FIG. 2 is a section through an infusion hole showing a plug assembly in place for its initial cooperative relationship with the working end of the expander mechanism;

FIG. 3 is a view similar to that of FIG. 2, and shows the plugging assembly and the expander means in the final phase of their cooperative relationship; and FIG. 4 is a section through an injection hole showing the plugging assembly secured therein for operation as a sealer means and check valve.

A most troublesome problem encountered in prior strata-bonding procedures was that of retaining the liquid adhesive in the injection hole until the adhesive hardened. When the liquid was held by leaving its injector in place in a hole until the adhesive gelled, the top of the injector in contact with the adhesive had to be forcibly removed with extensive damage to this injector part. Merely forcing a thick-wall rubber plug into a hole ahead of the injector was generally unsuccessful as a means for holding the fluid in the hole since the resins and other adhesives acted as highly effective lubricants and these plugs were forced from the holes solely by the weight of the liquid acting on them. The plugging assembly of the present invention was found to be a highly satisfactory solution to the problem. Essentially, this plugging means comprises a short length of aluminum tubing, fitting snugly in a cap-like hollow rubber plug formed as a thin walled cylinder surmounted by a cone-shaped tip. When used to hold fluid in a hole, this plug is inserted tip first into the hole, at the working end of an expander mechanism. Operation of the expander mechanism causes a steel cone which is initially partly within the aluminum tubing to be further jammed therein and to expand and deform the tubing whereby the thin rubber wall of the plug is also deformed between the tubing and the hole surface. Expanding the relatively non-resilient tubing to maintain the rubber tightly pressed against the circumference of the hole, gives the additional support for the plug necessary to maintain it from moving out due to the weight of the fluid, and the pressure therein, or the lubricating characteristics of the fluid employed.

An expander mechanism 10, is seen in FIG. 1, completely assembled, and in its fully operated condition for purposes of an adjustment during its assembly, as will be hereinafter more fully explained. In FIGS. 1 to 3, an expander element 11 is shown supported at the working end of mechanism 10. This expander element is symmetrically shaped as a relatively short and thick spindle having double tapered surfaces 12 and 13, with a narrow non-tapered surface 14 encircling an intermediate section thereof. On the opposite ends of element 11, are flat surfaces 15 and 16, normal to the longitudinal axis of the element, whereby they terminate the tapered surfaces to form two opposing truncated cones separated by the non-tapered surface 14. A longitudinal hole 17 through the expander 11, allows it to be supported for sliding movement upon a small diameter rod or shaft 21, constituting the central structural element of the expander mechanism 10.

A connector element which also guides the expander 11 for cooperation in the plug assembly, is provided at one end of rod 21, as a head or tip 22. This element is generally rectangular except for a portion thereof extending outwardly to form a point. Also fastened to the rod 21 at a short distance from the base of tip 22, is a collar 23. A screw thread 25 extends along about one-fourth of the rod 21, starting from the end opposite the tip 22. Expander 11 by means of its hole 17, is placed upon the threaded end of rod 21, and slipped forward to cause its end surface 15 to engage a matching surface on the collar 23 fixed to the rod 21.

Expander element 11 is made operatively effective when moved forward along the rod 21 by an actuator arrangement including two pipes 30 and 31, one slidable over the other. Pipe 30 which is made operable as a thrust means, has attached to one end a relatively large collar 32. In the arrangement, pipe 31 extends rearwardly from the collar end of pipe 30, and has fixed to it at a short distance from the collar, a pivot block 33. Extending out from the opposite sides of block 33, are pivot pins 34, adapted to provide a fulcrum support for a lever device 40. Arms 38 and 39 comprising the lever 40, have holes therein for pivotally mounting the lever 40 on the pivot pins of the block 33. A tubular spacer 43, and a hand grip 44 are secured in place between the arms by conventional nut and bolt means.

Pipes 30 and 31 in their nested arrangement, are slipped over the threaded end of rod 21, such that the end of pipe 30 without the collar, may contact the surface 16 of the expander element 11 previously positioned on the rod such that its surface 15 contacts the collar 23 fixed on the rod. Lever 40 is then adjusted to an angle of about seventy degrees with a line normal to the longitudinal axes of rod 21, and pipe 31 carrying the lever is slid along the rod and within pipe 30, towards the tip end of the rod until rounded end portions 42 of lever arms 38, 39, contact the collar 32. This position of adjustment which may be seen in FIG. 1, is carefully held until a nut 45 is turned sufficiently along the threads 25 of rod 21, to cause it to contact the end of fulcrum pipe 31, adjacent thereto. A second nut 46 is then brought along the threads 25, to lock the nut 45 in place. To complete the assembly of the expander mechanism, a hand grip 48 is screwed on the threaded end of the rod 21, and secured in place by a nut 49 movable along the threads 25.

The plugging assembly 50, shown in FIGS. 2 to 4, comprises the cap-like device of rubber formed by a cylindrical section 51 surmounted by a conical section 52. Positioned within the section 51, to form a base for the conical section 52, is a metal disk 53. A length of tubing 54 made of aluminum or other relatively soft metal, is fitted snugly and completely within the cylindrical section 51, such that its rim contacts the disk 53 to secure it in place between the sections 51 and 52 of the rubber plug. Disk 53, shown in cross-section in FIGS. 2 to 4, is provided with a rectangular slot 55, whose dimensions are slightly larger than those of the tip 22 at the end of rod 21. A slit 57, near the apex of conical section 52, permits the plugging assembly to function as a check valve during and after the adhesive liquid composition is injected.

To prepare the expander mechanism 10, as shown in FIG. 1, for use, it must be returned from its adjusted position to an initial set position wherein the lever 40 is turned to be normal to the longitudinal axis of the rod 21. As a result, camming ends 42 of the lever are removed from contact with collar 32, and pipe 30, and expander element 11 are free to move rearwardly from the tip end of the rod, to a position as shown in FIG. 2. Plugging assembly 50 is then slipped over the tip 22, such that the tip passes through the rectangular slot 55 in the disk 53 of the assembly. A quarter turn of the rod 21, while the plugging assembly is maintained stationary, places the long sides of tip 22 across the short sides of the slot 55, to lock the tip within the conical section 52 of the assembly, as may be seen in FIG. 3. With assembly 50 thus secured upon the expander mechanism, the tapered surface 13 of the expander, fits partly into the tubing 54 of the assembly. When set in this manner, the expander mechanism 10, may now ram the plugging assembly 50 into an infusion hole 60. Thereafter, with the apparatus steadied and aligned by means of handle 48, the lever handle 44 is gripped to draw lever 40 to its adjusted position at the seventy degree angle. Consequently, camming surfaces 42 on the fulcrumed lever arms 38, 39, drive the collar 32 and pipe 30 forward whereby the expander element 11 in contact with the other end of pipe 30, is rammed into the hollow within tubing 54. As shown in FIG. 3, the tapered and intermediate sections 13 and 14 of the expander are thereby made effective to expand and deform the soft metal of tubing 54, and the rubber of the cylindrical section 51 of the assembly against the walls of the infusion hole 60.

Removal of the expander mechanism 10 from the secured plugging assembly is accomplished by merely applying another quarter turn to the rod 21 to align the tip 22 in the slot 55, and withdrawing the mechanism in an obvious manner. Referring to FIG. 4, it can be seen that the expanded plugging assembly now remaining in the infusion hole 60, is securely held, and appropriately aligned to receive through the slot 55 of its disk 53, the tip of a liquid adhesive injector apparatus.

While a preferred embodiment of the invention has been illustrated and described herein, it is to be understood that the invention is not limited thereby, but is susceptible of changes in form and detail.

What is claimed is:

1. Apparatus for plugging an infusion hole including a deformable plug assembly in cooperative relationship with an expander mechanism,
   said plug assembly comprising
   a hollow stopper means of deformable material having as an integral part thereof an enclosure wall at one end formed as an outwardly extending cone-shaped portion with a slit near its apex,
   a slotted element,
   and a sleeve of pliable and substantially non-resilient material retaining said slotted element within the hollow stopper means such that the element is in position at the base of the cone-shaped portion,
   said expander mechanism comprising
   an elongated rod having at one end a keying means operable to be received through the slotted element of the plug assembly to engage a surface of the element within the cone-shaped enclosure portion,
   a material forming member slidably supported on said rod,
   two elongated hollow members nested together and slidably supported on said rod such that an end of one of said nested members is in contact with the forming member,
   and the other of said nested members having fixed thereon a pivot support means adjacent to a flange on the other end of the said one of the nested members,
   stop means fixed to said rod and in contact with one end of the other of said nested members for preventing movement of the pivot support means away from the said flange,
   and a lever means pivoted on said pivot support means and operable to slidably contact the flange on the said one of the nested members whereby the latter is displaced relative to the other of said nested members and the rod such that it displaces the forming member to enter a substantial part thereof within the said sleeve to expand and deform the sleeve and the hollow stopper means in contact therewith.

2. In an apparatus for plugging a hole of a predetermined conformation, a deformable plug assembly for cooperation with an expander mechanism, comprising
   a hollow stop gap means of deformable material having as integral parts thereof a portion having said conformation and surmounted by an outwardly extending cone-shaped portion,
   a slotted element,
   and an insert of pliable and substantially non-resilient material contacting a substantial part of an inner wall of said conformed portion of said integral parts and supporting said slotted element contiguous to a basal part of said cone-shaped portion within the hollow of said stop gap means whereby the slot of said element is positioned for receiving therethrough a key of said expander mechanism provided to releasably maintain said mechanism in operative association with said plug assembly.

3. Apparatus for plugging an infusion hole including a deformable plug assembly in cooperative relationship with an expander mechanism,
   said plug assembly comprising
   a hollow cap-like element of deformable material having as an integral part thereof an enclosure at one end forming an outwardly extending cone-shaped portion with a slit near its apex,
   and containing within said cap-like element a slotted disk and a sleeve of soft metal retaining said disk in position at the base of the cone-shaped portion,
   said expander mechanism comprising
   a shaft having an enlarged head means operable to be received through the slotted disk of the plug assembly to engage a surface of the disk within the cone-shaped portion of the cap-like element,
   an expander element slidably supported on said shaft, and having a cylindrical surface between two oppositely directed tapered surfaces,
   two relatively slidable hollow members supported on said shaft such that a first member is within a second member and one end of the latter is in contact with the expander element, said first member having fixed near one end thereof a pivot support means adjacent to a flange on the other end of the second member,
   stop means fixed to said shaft and in contact with the said one end of the first member for preventing displacement of said pivot support means away from the said flange,
   and a lever means pivoted on said pivot support means and operable to slidably contact the flange on the second member whereby the latter is displaced relative to said first member and shaft such that it displaces the expander element to cause one of its tapered and its cylindrical surfaces to enter completely within the soft metal sleeve to expand and deform the sleeve and the hollow cap-like element in contact therewith.

4. In an apparatus for plugging an infusion hole, an expander mechanism for cooperation with a locking part of a hollow deformable plug assembly, comprising
   an elongated shaft having a keying element at one end thereof provided to coact with said locking part to retain said shaft in a separable connection with said plug assembly,
   an expander device displaceable along said shaft,
   actuator means including a first member supported on said shaft, a second member nested thereon and slidably maintained with respect thereto and to said shaft,
   and further means including means pivotally attached to said first member and operable thereon to forceably apply a portion of said pivotal means to one end of said second member whereby another end thereof contacts and slidably displaces said expander device within the hollow of said plug assembly to deform the latter, and means fixedly attached to said shaft to rotate said keying element with respect to said locking part to effect a separation between said plug assembly and said expander mechanism.

5. Apparatus for plugging an infusion hole including a deformable plug assembly in cooperative relationship with an expander mechanism,
   said plug assembly comprising
   a substantially cylindrical hollow rubber packer element open at one end and enclosed at an opposite end by an outwardly extending cone-shaped portion having a slit near its apex,
   a slotted disk
   and a cylindrical aluminum sleeve in contact with an inner wall surface of the packer element and positioned therein to retain the slotted disk within the packer element at the base of the cone-shaped portion thereof, said expander mechanism comprising a shaft having at one end an enlarged head and a collar-like flange spaced therefrom, and at its other end a threaded portion, an expander element having an intermediate section defining a cylindrical surface, and sections extending from opposite ends thereof defining oppositely tapered surfaces, a first elongated pipe member having pivot support means affixed near one end thereof, a second elongated pipe member having an enlarged collar-like flange at one end thereof, said first pipe member being slidably nested within the second pipe member such that the pivot support means is adjacent to the enlarged collar-like flange, said shaft receiving for relative displacement thereon the expander element having one end thereof in close proximity to the collar-like flange at the said one end of the shaft, and the nested pipe members whereby the other end of the second pipe member is in contact with the other end of the expander element, said threaded portion of said shaft having secured thereon a handle and a stop means in contact with the said one end of the first pipe member, said enlarged head portion of the shaft being received through the slotted disk of the plug assembly, to engage a surface of the disk within the cone-shaped portion of the packer element, and a part of one of the tapered surfaces of the expander element being received within the aluminum sleeve, and a lever means pivoted on said pivot support means and operable to slidably contact the said enlarged collar-like flange to displace the second pipe member relative to the first pipe member such that the second pipe member displaces the expander element on the shaft to contact the collar-like flange thereof whereby the said one of the tapered surfaces and said cylindrical surface of the expander element enter completely within the aluminum sleeve to expand and deform the sleeve and the packer element in contact therewith.

References Cited by the Examiner

UNITED STATES PATENTS

| | | | |
|---|---|---|---|
| 1,042,425 | 10/1912 | Galbraith | 166—144 |
| 1,246,957 | 11/1917 | Lindsay | 166—199 |
| 1,843,497 | 2/1932 | Shuster | 166—135 |
| 1,883,196 | 10/1932 | Wertz. | |
| 1,888,642 | 11/1932 | Tryon | 29—235 X |
| 2,005,367 | 6/1935 | Halliburton | 61—63 |
| 2,228,244 | 1/1941 | Baker | 166—243 |
| 2,313,109 | 3/1943 | Wertz | 61—36 |
| 2,729,893 | 10/1955 | Foreman | 138—89 |
| 2,811,839 | 11/1957 | McReynolds | 61—35 |

FOREIGN PATENTS 639,074   6/1950   Great Britain.

EARL J. WITMER, *Primary Examiner.*